(12) United States Patent
Sakamura et al.

(10) Patent No.: US 8,122,261 B2
(45) Date of Patent: Feb. 21, 2012

(54) DATA COMMUNICATION APPARATUS AND DATA COMMUNICATION METHOD

(75) Inventors: Ken Sakamura, Tokyo (JP); Noboru Koshizuka, Musashino (JP); Masayuki Terada, Yokosuka (JP); Kensaku Mori, Yokohama (JP); Kazuhiko Ishii, Yokohama (JP); Sadayuki Hongo, Yokohama (JP)

(73) Assignees: NTT DoCoMo, Inc., Tokyo (JP); Ken Sakamura, Tokyo (JP); Noboru Koshizuka, Musashino-shi (JP)

( * ) Notice: Subject to any disclaimer, the term of this patent is extended or adjusted under 35 U.S.C. 154(b) by 1106 days.

(21) Appl. No.: 11/587,091

(22) PCT Filed: Apr. 21, 2005

(86) PCT No.: PCT/JP2005/007645
§ 371 (c)(1),
(2), (4) Date: Aug. 15, 2007

(87) PCT Pub. No.: WO2005/104457
PCT Pub. Date: Nov. 3, 2005

(65) Prior Publication Data
US 2008/0133923 A1 Jun. 5, 2008

(30) Foreign Application Priority Data
Apr. 21, 2004 (JP) ................ P2004-126043

(51) Int. Cl.
*G06F 11/30* (2006.01)
*G06F 12/14* (2006.01)
*G06F 7/04* (2006.01)
*G06F 15/167* (2006.01)
*G06Q 40/00* (2006.01)

(52) U.S. Cl. .......... 713/193; 713/194; 726/26; 709/216; 705/41

(58) Field of Classification Search ........... 713/193–194
See application file for complete search history.

(56) References Cited

U.S. PATENT DOCUMENTS
6,549,773 B1 * 4/2003 Linden et al. .............. 455/426.1
(Continued)

FOREIGN PATENT DOCUMENTS
JP   2001 084194   3/2001
(Continued)

OTHER PUBLICATIONS

Hiroshi Aono, et al., "Securely Transferable Entity Platform for Mobile Communications", The Institute of Electronics, Information and Communication Engineers Gijutsu Kenkyu Hokoku, vol. 2002, pp. 67-73, 2002. (with English abstract).

(Continued)

*Primary Examiner* — Taghi Arani
*Assistant Examiner* — Morshed Mehedi
(74) *Attorney, Agent, or Firm* — Oblon, Spivak, McClelland, Maier & Neustadt, L.L.P.

(57) ABSTRACT

Realizing a data communication device and a data communication method enabling to specify an IC memory mounted in the communication device and to perform data communication to the communication device in which the IC memory is mounted.

A mobile device 100 of transmitting side accepts a domain ID specifying a detachable IC memory uniquely from an application 102, a communication driver 105 obtains an IP address of the device of correspondent on the basis of the accepted domain ID from a name server 300 storing the domain ID and the IP address being associated with each other. Then, the communication driver 105 obtains a port ID which an IC memory of the device of correspondent assigned to an application, and transmits the domain ID and the port ID together with a transmission data to the IP address. The device of correspondent rims the application based on the received port ID and executes an appropriate processing.

2 Claims, 8 Drawing Sheets

U.S. PATENT DOCUMENTS

| | | | | |
|---|---|---|---|---|
| 6,611,819 | B1* | 8/2003 | Oneda | 705/41 |
| 6,658,497 | B1* | 12/2003 | Kawasaki et al. | 710/8 |
| 6,728,686 | B2* | 4/2004 | Kasai et al. | 705/41 |
| 6,769,608 | B2* | 8/2004 | Nishimura | 235/380 |
| 7,047,558 | B1* | 5/2006 | Mariana | 726/3 |
| 7,185,207 | B2* | 2/2007 | Aruga | 713/193 |
| 7,333,958 | B2* | 2/2008 | Oshima et al. | 705/65 |
| 7,366,699 | B1* | 4/2008 | Kusakabe et al. | 705/43 |
| 2002/0085511 | A1* | 7/2002 | Koponen et al. | 370/315 |
| 2002/0124092 | A1* | 9/2002 | Urien | 709/229 |
| 2002/0138430 | A1* | 9/2002 | Wagner | 705/41 |
| 2003/0055870 | A1* | 3/2003 | Smethers | 709/203 |
| 2003/0088618 | A1* | 5/2003 | Sueyoshi et al. | 709/203 |
| 2003/0092434 | A1* | 5/2003 | Irisawa | 455/418 |
| 2003/0112782 | A1* | 6/2003 | Mizell et al. | 370/338 |
| 2003/0236744 | A1 | 12/2003 | Sakamura et al. | |
| 2004/0025021 | A1* | 2/2004 | Aikawa et al. | 713/172 |
| 2004/0206812 | A1* | 10/2004 | Tamagno et al. | 235/380 |
| 2005/0066044 | A1* | 3/2005 | Chaskar et al. | 709/230 |

FOREIGN PATENT DOCUMENTS

| | | |
|---|---|---|
| JP | 2003 123031 | 4/2003 |
| JP | 2003 317070 | 11/2003 |
| JP | 2004 013735 | 1/2004 |

OTHER PUBLICATIONS

Ken Sakamura, et al., "The Etron Wide-Area Distributed-System Architecture for E-Commerce", IEEE Micro, vol. 21, pp. 7-12, 2001.

* cited by examiner

DATA COMMUNICATION APPARATUS AND DATA COMMUNICATION METHOD

TECHNICAL FIELD

The present invention relates to a data communication device and a data communication method capable of transmitting data addressed to a specific IC memory.

BACKGROUND ART

In a conventional communication method, an application running on a device as a communicator has communicated with an application of the device of correspondent. For example, an application of an electronic mail and the like may specify the device of correspondent using an e-mail address to send an e-mail to an e-mail application (or a mail server) which is to be the device of correspondent via the Internet, LAN (Local Area Network), and the like.

Further, as an invention that a memory card is mountable, the invention described in the Patent Document 1 can be listed, which describes writing/reading a mail data to/from a memory card.

[Patent Document 1] Japanese Patent Application Laid-open No. 2001-84194

DISCLOSURE OF THE INVENTION

Problem to be Solved by the Invention

A communication device on which a memory card such as an IC memory can be mounted detachably exists as described in the Patent Document 1, however, the memory card described in the Patent Document 1 is used only for writing/reading data thereto/therefrom. Therefore, it covers a data transmission addressed to a communication device, which does not consider the case where desiring a transmission addressed to a communication device on which a specific IC memory is mounted.

Recently, however, there may be a case where a transmission addressed to a communication device on which a specific detachable IC memory is mounted is desired. For example, when using a communication device on which electronic money application is installed, there may be a case where a user desires to draw/remit electronic money data registered in the IC memory, and therefore, there may be a case where the user desires to carry around only the IC memory when going out and insert the IC memory into a communication device palaced at a place where the user is staying to execute transactions of electronic money by using the communication device. In this case, it is necessary to specify the IC memory to transmit and receive the data, rather than specify the communication device to deal.

So far, a communication device per se has been specified as a destination, which made it impossible to transmit data addressed to an IC memory mounted on the communication device, and therefore, realizing the electronic money application has been difficult.

Therefore, the object of the present invention is to realize a data communication device and a data communication method enabling to specify an IC memory mounted on a communication device and to transmit data to the communication device on which the IC memory is mounted.

Means for Solving the Problem

To solve the problem, a data communication device according to the present invention comprises: an accepting means for accepting a domain ID specifying a detachable IC memory uniquely; a destination information obtaining means for obtaining a destination information of the device of correspondent from a server by transmitting the domain ID accepted by the accepting means to the server storing the domain ID and the destination information being associated with each other; a port ID obtaining means for transmitting information specifying a type of application to the device of correspondent having the destination information obtained by the destination information obtaining means to obtain a port ID which an IC memory of the device of correspondent assigned to the same type of application as that of the application; and a transmission means for transmitting the domain ID accepted by the accepting means and the port ID obtained by the port ID obtaining means together with a transmission data to the destination indicated by the destination information obtained by the destination information obtaining means.

Further, a data communication method according to the present invention comprises: an accepting step of accepting a domain ID specifying a detachable IC memory uniquely; a destination information obtaining step of obtaining an destination information of the device of correspondent corresponding to the accepted domain ID from a server by transmitting the accepted domain ID to the server storing the domain ID and the destination information being associated with each other; a port ID obtaining step of transmitting information specifying a type of application to the device of correspondent having the obtained destination information to obtain a port ID which an IC memory of the device of correspondent assigned to the same type of application as that of the application; and a transmission step of transmitting the accepted domain ID and the obtained port ID together with a transmission data to the destination indicated by the destination information obtained in the destination information obtaining step.

According to the configuration of the present invention, retrieving the destination information corresponding to the domain ID of the destination to which a transmission is desired to be made from the server storing the domain ID specifying the IC memory uniquely in relationship to the destination information, retrieving the port ID on the basis of the information specifying the type of application from the device of correspondent of the retrieved destination information, and transmitting the retrieved domain ID capable of specifying the IC memory and the port ID assigned by the IC memory, together with a data, make it possible to communicate with the communication device on which the IC memory is mounted by specifying the IC memory per se without executing a complicated management even if the IC memory is mounted on the other device.

A data communication device according to the present invention further comprises: a key obtaining means for obtaining a public key corresponding to the domain ID accepted by the accepting means; and an encryption means for encrypting a transmission data to be transmitted by the transmission means using the public key obtained by the key obtaining means; wherein the transmission means transmits the transmission data encrypted by the encryption means.

According to the configuration of the present invention, a data to be transmitted is encrypted with the public key corresponding to the domain ID, which improves the confidentiality of communication.

Further, a data communication device according to the present invention further comprises: a digital signature means for attaching a digital signature to the transmission data to be transmitted by the transmission means, wherein the transmission means transmits the transmission data to which an electronic signature is attached by the digital signature means.

According to the configuration of the present invention, attaching the digital signature to the data to be transmitted is able to vouch for the validity thereof.

Further, a data communication device according to the present invention comprises: a detachable IC memory storing a domain ID capable of specifying the IC memory uniquely, and assigning a port ID in response to a request for assigning the port ID from an application, and storing information specifying a type of the assigned application in relationship to the assigned port ID; a registration means for registering the domain ID specifying the IC memory uniquely when the IC memory is mounted therein, in relationship to a destination information of the device body, in a server placed in a network; a receiving means for receiving information specifying a type of application running on the device of correspondent from the device of correspondent transmitting data with the IC memory as its destination; a retrieving means for retrieving from the IC memory a port ID corresponding to the information specifying the type of application received by the receiving means; and a transmission means for transmitting the port ID retrieved by the retrieving means to the device of correspondent.

Further, a data communication method according to the present invention comprises: a registration step of, when an IC memory is mounted, registering in a server placed in a network, a domain ID capable of specifying the IC memory uniquely in relationship to a destination information of a device body in which the IC memory is mounted, after the registration step, in the IC memory, an assigning step of assigning a port ID in response to a request for assigning the port ID from an application and a storing step of storing information specifying a type of the assigned application in relationship to the assigned port ID; a receiving step of receiving information specifying a type of application running on the device of correspondent from the device of correspondent transmitting data with the IC memory as its destination; a retrieving step of retrieving from the IC memory a port ID corresponding to the received information specifying the type of application; and a transmission step of transmitting the retrieved port ID to the device of correspondent.

According to the configuration of the present invention, assigning the port ID to each application, and informing the port ID in response to a request from the device of correspondent, make it possible that the device of correspondent obtains the port ID corresponding to the application running on the device of correspondent side, the device of correspondent transmits data addressed to the obtained port ID, and communicates with the communication device having an IC memory by specifying the IC memory per se without executing a complicated management even if the IC memory is mounted on the other device.

Further, a data communication device according to the present invention comprises: an accepting means for accepting a domain ID specifying a detachable IC memory uniquely; an obtaining means for transmitting the domain ID accepted by the accepting means and information specifying a type of application with the broadcast to obtain a destination information corresponding to the transmitted domain ID and a port ID corresponding to the transmitted information specifying the type of application from a device in a network corresponding to the domain ID transmitted with the broadcast; and a transmission means for transmitting the domain ID accepted by the accepting means and the port ID obtained by the obtaining means together with a transmission data to the destination indicated by the destination information obtained by the obtaining means.

Further, a data communication method according to the present invention comprises: an accepting step of accepting a domain ID specifying a detachable IC memory uniquely; a broadcast-transmission step of transmitting the accepted domain ID and information specifying a type of application with the broadcast; an obtaining step of obtaining a destination information corresponding to the transmitted domain ID and a port ID corresponding to the transmitted information specifying a type of application from a device in a network having the same domain ID as that transmitted with the broadcast; and a data transmission step of transmitting the domain ID accepted in the accepting step and the port ID obtained in the obtaining step together with a transmission data to the destination indicated by the obtained destination information.

According to the configuration of the present invention, transmitting with the broadcast the accepted domain ID and the information specifying a type of application and receiving a response of the port ID from the device having the same domain ID do not necessitate the name server storing the domain ID in relationship to the destination information and make it possible to obtain the destination information and the port ID of the other side and to transmit by specifying the detachable device such as an IC memory uniquely, without the processing of registering in the name server.

Effect of the Invention

According to the present invention, retrieving the destination information corresponding to the domain ID of the destination to which a transmission is desired to be made, from the server storing the domain ID specifying the IC memory uniquely in relationship to the destination information, retrieving the port ID on the basis of the information specifying the type of application from the device of correspondent of the retrieved destination information, and transmitting the retrieved domain ID capable of specifying the IC memory and the port ID assigned by the IC memory, together with a data make it possible to communicate with the communication device on which the IC memory is mounted by specifying the IC memory per se without executing a complicated management even if the IC memory is mounted on the other device.

Further, according to the present invention, assigning the port ID to each application, and informing the port ID in response to a request from the device of correspondent make it possible that the device of correspondent obtains the port ID corresponding to the application running on the device of correspondent, transmits data addressed to the obtained port ID, and communicates with the communication device having the IC memory by specifying the IC memory per se without executing a complicated management even if the IC memory is mounted on the other device.

Further, according to the present invention, transmitting with the broadcast the accepted domain ID and the information specifying a type of application and receiving a response of the port ID from the device having the same domain ID do not necessitate the name server storing the domain ID in relationship to the destination information and make it possible to obtain the destination information and the port ID of the device of correspondent and to transmit by specifying the detachable device such as an IC memory uniquely, without the processing of registering in the name server.

Figure 1:
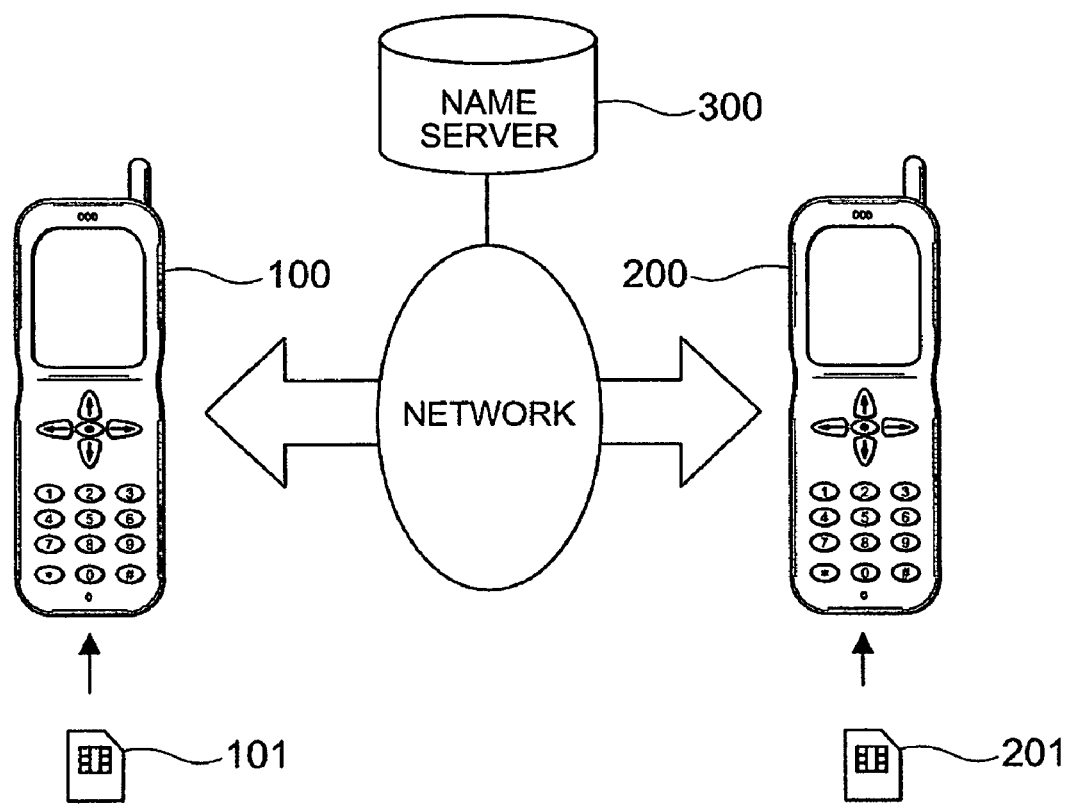
FIG. 1 is a network system configuration diagram in which a mobile device 100 of the present invention is used.

EXPLANATION OF REFERENCE NUMERALS 100, 200 mobile device
101, 201 IC memory
102, 202 application
103, 203 IC memory driver
104, 204 domain ID registration section
105, 205 communication driver
106, 206 communication section

BEST MODE FOR CARRYING OUT THE INVENTION

A data communication device and a data communication method according to the present invention will now be explained referring to the drawings. Firstly, the outline of the present application will be described. FIG. 1 is a system diagram showing the data communication device of the present invention in which a mobile device 100 is used. As shown in FIG. 1, the mobile device 100 is capable of communicating with a mobile device 200 that is the device of correspondent, via a radio network. The mobile device 100 and the mobile device 200 may be detachably provided with an IC memory 101 and an IC memory 201 respectively. Even if the IC memory 201 is removed from the mobile device 200 to be mounted on the other mobile device, the mobile device 100 is able to specify on which mobile device the IC memory 201 is mounted using a name server 300.

Figure 2:
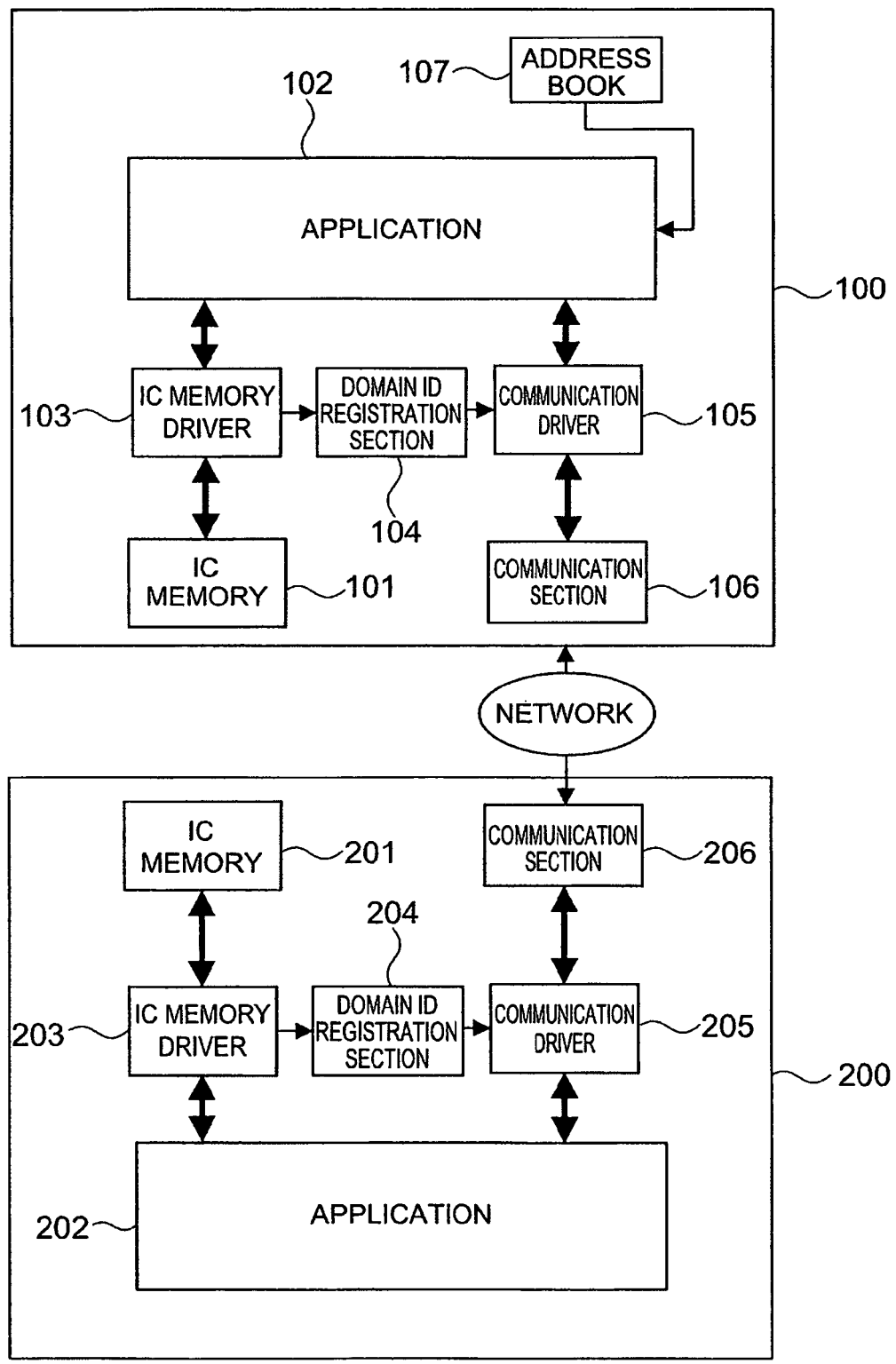
FIG. 2 is a block diagram of the mobile device 100 and a mobile device 200 of the present invention.

Next, the processing of specifying the IC memory 201 mounted on the mobile device 200 executed in the mobile device 100 will be explained. FIG. 2 is a block diagram of the mobile device 100.

The mobile device 100 is provided with an IC memory 101, an application 102 (an accepting means and a digital signature means of the present invention), an IC memory driver 103, a domain ID registration section 104, a communication driver 105 (an address information obtaining means, a port ID obtaining means, and a transmission means of the present invention), a communication section 106 (a transmission means of the present invention), and an address book 107.

The IC memory 101 is storing a pre-assigned domain ID capable of specifying the IC memory uniquely, further detachably provided for the mobile device 100, and storing various types of data. In this embodiment, it is assumed to be able to store electronic money data. Moreover, it has a function of assigning a port ID capable of specifying an application uniquely in response to a request from the application.

The application 102 is one which is capable of running on the mobile device, and it is assumed to be an application for performing an electronic payment processing in the present invention. Also the application 102 may accept the domain ID capable of specifying (the IC memory of) the device of correspondent uniquely with a user's input operation, issue a bill to the device of correspondent, and register electronic money data received from the correspondent in the IC memory 101.

The IC memory driver 103 is a driver software for performing a data access to the IC memory in response to a request from the application 102. The IC memory driver 103 executes a processing of registration and drawing the electronic money to the IC memory 101 according to the instruction of the application 102. Further, when detecting that the IC memory 101 is mounted, it retrieves the domain ID registered in the IC memory 101 to pass it to the domain ID registration section 104 described later.

The domain ID registration section 104 accepts the domain ID from the IC memory driver 103 to execute a processing of registering it in the name server 300. The registration processing is executed via the communication driver 105 described later.

Figure 3:
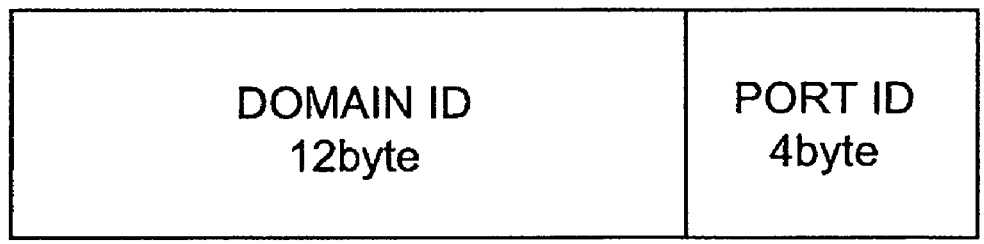
FIG. 3 is a schematic diagram explaining eTRON ID used by the mobile device 100 of the present invention.

The domain ID registered here is a part of eTRON ID. The particulars thereof are shown in the drawing. FIG. 3 is a detailed drawing of eTRON ID composed of domain ID and port ID, As shown in FIG. 3, eTRON ID consists of 12 bytes of domain ID and 4 bytes of port ID. The domain ID is an ID specifying a device such as an IC memory. The port ID is an ID which a device such as an IC memory assigns to an application when the application using the device is activated. The data communication device according to the present invention is capable of communicating with the domain ID and port ID as a destination.

Further, the domain ID registration section 104 retrieves an IP address which is an address of the name server and an IP address of the mobile device 100 from the memory preliminary storing these IP addresses therein to output them to the communication driver 105 described later. In addition, a telephone number and an e-mail address instead of the IP address may be output to the communication driver 105 as destination information.

The communication driver 105 is a driver software controlling a communication section 106, executes a processing of registering the IP address of the mobile device 100 (own device) retrieved and output from the domain ID registration section 104, and the domain ID retrieved from the IC memory 101 addressed to the IP address of the name server 300 obtained at the domain ID registration section 104. Further, when desiring to obtain an IP address of the device of correspondent, the communication driver 105 transmits a domain ID of the device of correspondent to the name server 300 to obtain IP address of the device of correspondent corresponding to the domain ID. Moreover, by transmitting a request for obtaining the port ID and information specifying a type of application running in the mobile device 100 to the mobile device 200 as the device of correspondent, the communication driver 105 retrieves the port ID assigned to the same type of application as the transmitted information specifying the type of application in the mobile device 200. Further, it executes the processing of receiving the electronic money data from the mobile device 200 to pass it to the application 102. In addition, a telephone number and an e-mail address instead of the IP address may be the destination information.

The communication section 106 has a function of connecting with the name server 300 and an external network.

The address book 107 is composed of a memory storing the domain ID of the device of correspondent, and the address book 107 is able to output the registered domain IDs to the application 102 in response to its request, making the application 102 display the listing thereof so that they may be input selectively. This address book 107 is generated by a user's preliminary registration processing.

The block diagram of the mobile device 100 has been explained above, and the mobile device 200 is also configured to comprise an IC memory 201 (IC memory of the present invention), an IC memory driver 203 (an obtaining means of the present invention), a domain ID registration section 204 (a registration means of the present invention), a communication driver 205 (receiver and transmission means of the present invention) and a communication section 206 (receiver and transmission means of the present invention).

The IC memory 201 is preliminary assigned the domain ID, storing the assigned domain ID. It also assigns the predetermined port ID to the application 202 in response to a request of the application 202. The assigned port ID is uniquely assigned and managed by the IC memory 201 in such a manner that the same one does not exist. Further, it stores the assigned port ID in relationship to information specifying the type of application (a label of application (a category such as an application handling electronic money, an application handling an electronic ticket, and an application handling an electronic signature)).

The application 202 starts up, and then, makes a request for assigning the port ID to the IC memory 201 as described above. Further, on starting up according to the instruction from the communication driver 205, it may execute the processing of drawing the electronic money form the IC memory 201. Also when receiving the bill, it may draw the electronic money data from the IC memory 101 to transmit the data to the device of correspondent.

The communication driver 205 instructs the IC memory driver 203 to retrieve the port ID from the IC memory 201 when receiving a request for obtaining the port ID from the mobile device 100. The IC memory driver 203 retrieves the port ID from the IC memory 201 to pass it to the communication driver 205. Further, when receiving a message M and a port ID which are the data transmitted from the mobile device 100, the communication driver 205 activates the application corresponding to the port ID. Further, it transmits the data (electronic money data) received from the IC memory 201 to the mobile device 100 via the application 202.

The other configuration of the mobile device 200 operates in the same manner as the mobile device 100.

Figure 4:
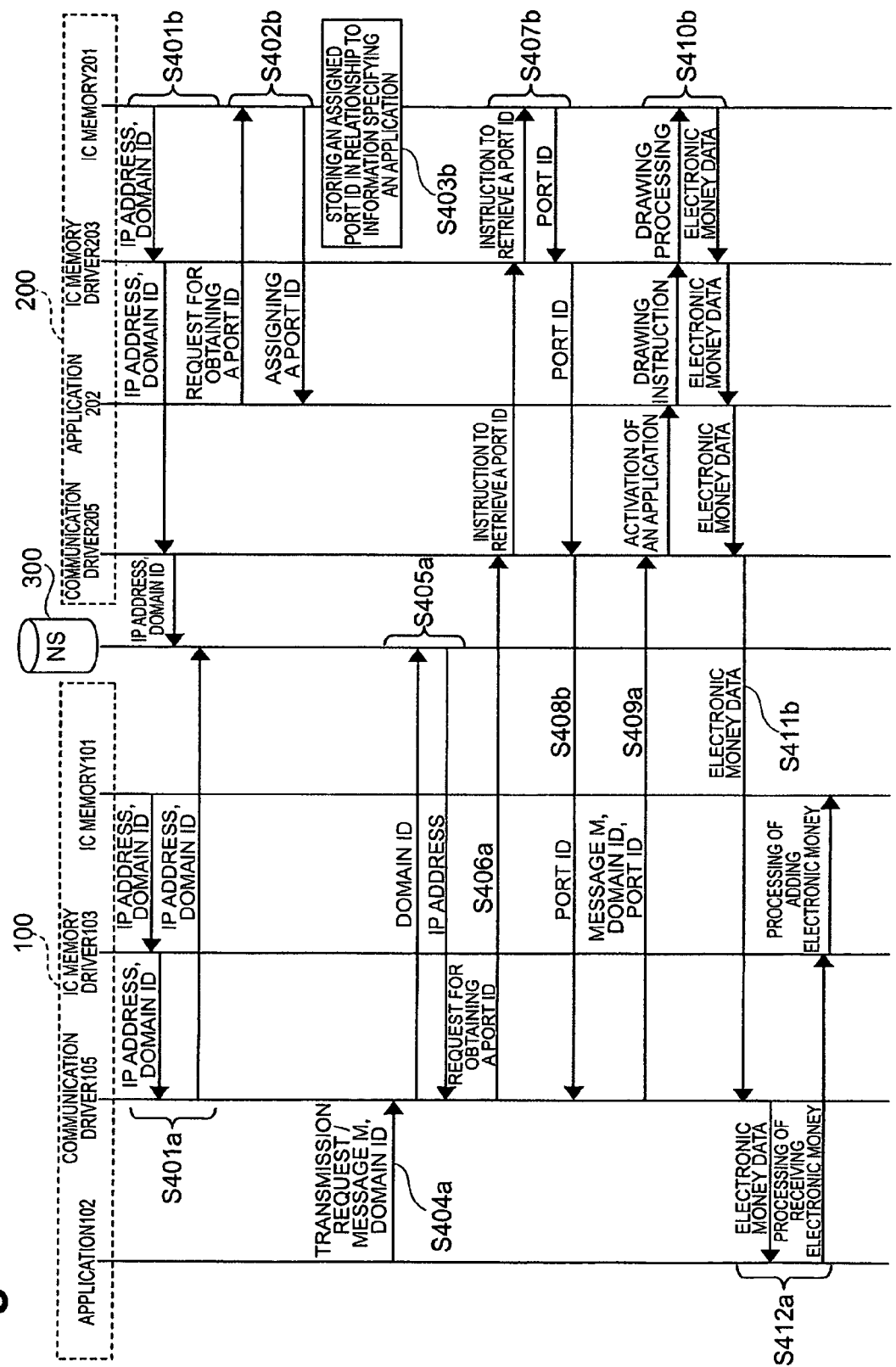
FIG. 4 is a sequence diagram showing a communication processing between the mobile device 100 and the mobile device 200 of the present invention.

Next, the detailed processing to be executed when the mobile device 100 configured above executes a processing of payment with electronic money to the IC memory mounted on the mobile device 200 will be explained. FIG. 4 is a sequence diagram thereof.

In the mobile device 100, when the IC memory 101 is mounted, the IC memory driver 103 detects this, retrieves the domain ID preliminary registered in the IC memory 101 and outputs the retrieved domain ID to the domain ID registration section 104. The domain ID registration section 104 outputs the received domain ID, the IP address of the mobile device 100 together with the IP address as a destination of the name server 300 to the communication driver 105. The communication driver 105 transmits the domain ID and the IP address of the mobile device 100 being associated with each other addressed to the name server 300, where the domain ID and the IP address of the mobile device 100 are registered being associated with each other (S401a). In the mobile device 200, the same registration processing is executed (S401b).

In the mobile device 200, the activated application 202 makes a request for assigning a port ID to the memory 201. The IC memory 201 assigns a port ID to the activated application 202 (S402b), and stores the assigned port ID in relationship to information specifying the assigned application 202 (a label of application (a category such as an application handling electronic money, an application handling an electronic ticket, an application handling an electronic signature)) (S403b).

Thus, different types of information are registered in the name server 300, and in the mobile device 200, the port ID of the application 202 is assigned. A user utilizing the mobile device 100 (IC memory 101) is informed of only the domain ID by a user utilizing the IC memory 201, and the informed domain ID is registered in the address book 107.

The mobile device 100 operates an application for the electronic payment processing and outputs a message M which is a bill data together with the domain ID of the IC memory 201 mounted on the mobile device 200 to the communication driver 105 in order to execute a processing of transmitting the bill data to the mobile device 200 (S404a).

The communication driver 105 transmits the domain ID of the IC memory of the mobile device 200 to the name server 300 to obtain the IP address corresponding to the transmitted domain ID. Namely, the name server 300 retrieves the IP address stored therein being associated with the domain ID after receiving the domain ID from the mobile device 100, and replies the retrieved IP address to the mobile 100 (S405a).

The communication driver 105 requests for retrieving the port ID addressed to the IP address received from the name server 300 (S406a). This request includes information specifying a type of application running in the mobile device 100, for example, information specifying a label of application as well as information indicating a category such as an application handling electronic money, an application handling an electronic ticket, and an application handling an electronic signature.

The communication driver 205 of the mobile device 200 that receives this request, outputs the information specifying a type of application running in the mobile device 100 to the IC memory driver 203. The IC memory driver 203 retrieves the corresponding port ID from the IC memory on the basis of the information specifying the type of the specific application running in the mobile device 200. Then, the IC memory driver 203 outputs the retrieved port ID to the communication driver 205 (S407b). The communication driver 205 transmits the port ID to the mobile device 100 (S408b). It is assumed here that, the same label (category) of application may perform the same processing such as handling electronic money, handing an electronic ticket, and handling an electronic signature without regard to the identity of the application.

The communication driver 105 of the mobile device 100 transmits as a set of the received port ID, accepted domain ID and the message M which is the bill data to be transmitted addressed to the mobile device 200 (S409a).

The communication driver 205 of the mobile device 200 calls an application corresponding to the port ID to be activate. The application 202 is assumed here to perform an electronic payment processing. When the application 202 judges that the bill data has been transmitted, the application 202 recognizes the amount of money described in the bill data, and detects the domain ID transmitted as the destination to judge that the transmission has been made addressed to the IC memory. Then, the application 202 instructs the IC memory driver 203 to draw the amount of electronic money from the IC memory 201. The IC memory driver 203 executes the processing of drawing the amount of electronic money described in the bill data from the IC memory 201 and outputs this to the application 202. The application 202 instructs the communication driver 205 to transmit the electronic money data to the mobile device 100 (S410b). The communication driver 205 transmits the electronic money data to the mobile device 100 (S411b).

The communication driver 105 of the mobile device 100 receives the electronic money data and outputs this to the application 102. The application 102 detects that the electronic money data has been received and instructs the IC memory driver 103 to execute the processing of adding the electronic money data to the IC memory 101. The IC memory driver 103 executes a summing processing (S412a).

In addition, in the application 102, attaching a digital signature to the massage M to be transmitted may vouch for the validity of the message M. Specifically, the application 102 attaches the predetermined signature to the message M and encrypts the signature by using a secret key owned by a sending side to transmit. The receiving side decrypts the signature using a signatory's public key. If decrypted correctly, the receipt of the data that is correct may be confirmed.

The effect of the present invention described above will be explained below. Transmitting the domain ID capable of specifying the IC memory and the port ID assigned by the IC memory, together with a data makes it possible to communicate with the communication device on which the IC memory is mounted by specifying the IC memory per se without executing a complicated management even if the IC memory is mounted on the other device.

Subsequently, the processing executed when encrypting the bill data to be transmitted using the public key corresponding to the domain ID will be explained.

Figure 5:
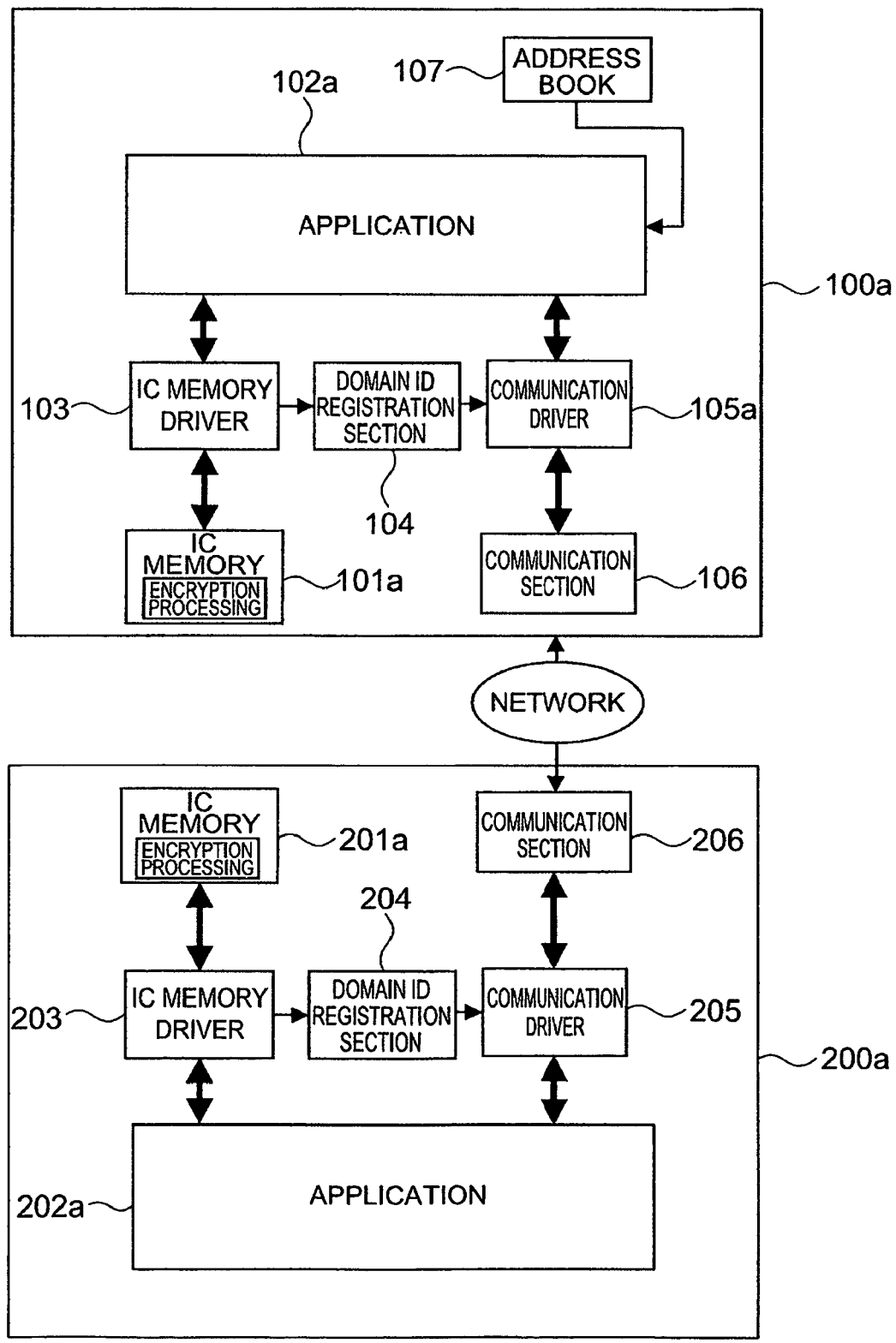
FIG. 5 is a block diagram of a mobile device 100a executing an encryption processing, and a mobile device 200a executing a decryption processing of the present invention.

FIG. 5 is a block diagram of mobile devices 100a and 200a executing an encryption processing. The mobile devices 100a and 200a shown in this drawing have the following function in addition to the configuration explained referring to FIG. 2 described above.

The mobile device 100a of the present invention comprises an IC memory 101a (an encryption means of the present invention), an application 102a, an IC memory driver 103, a domain ID registration section 104, a communication driver 105a (a key obtaining means of the present invention), and a communication section 106, and further, the mobile device 200a comprises an IC memory 201a, an application 202a, an IC memory driver 203, a domain ID registration section 204, a communication driver 205, and a communication section 206.

The application 102a has a function of asking for encryption to the IC memory 101a when transmitting the bill data consisting of the message M.

The communication driver 105a has a function of accessing to a key server to obtain the public key corresponding to a domain ID of the communication destination, after receiving an encryption request from the application 102a. The IC memory 101a encrypts the bill data which is the message M to be transmitted using the obtained public key to generate the bill data which becomes a message C.

The application 202a of the mobile device 200a makes the IC memory 201a execute a decryption processing via the IC memory driver 203 after receiving the encrypted message C.

The IC memory 201a executes the decryption processing of the message C using a preliminary holding secret key to generate the message M.

Figure 6:
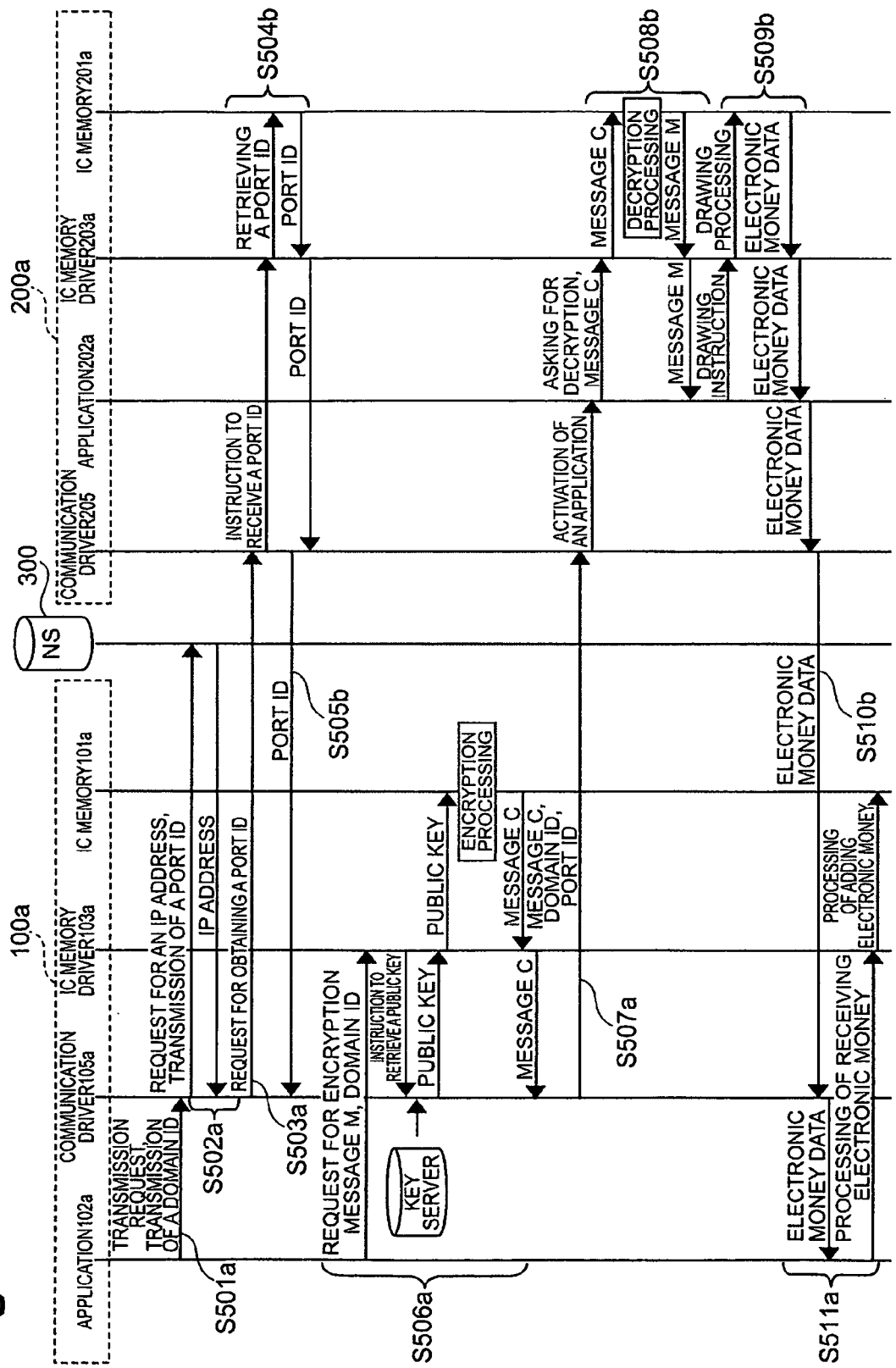
FIG. 6 is a sequence diagram showing a communication processing between the mobile device 100a and the mobile device 200a of the present invention.

The processing and operation thereof will be hereafter explained. FIG. 6 is a sequence diagram of the processing. It is assumed here that the processing of registering the domain ID shown in FIG. 4 (S401a, etc.) and the processing of assigning the port ID (S402b), or the like are already executed.

Firstly, the application 102a transmits to ask for a processing of issuing the bill data, accepts the domain ID, and outputs the accepted domain ID to the communication driver 105a (S501a). The communication driver 105a accepts this, outputs the domain ID to the name server 300, and obtains the corresponding IP address from the name server 300 (S502a). The name server 300 is configured in the same manner as described above.

The communication driver 105a requests for retrieving the port ID addressed to the IP address received from the name server 300 (S503a). This request includes information specifying a type of application running in the mobile device 100, such as a label of application (a category such as an application handling electronic money, an application handling an electronic ticket, an application handling an electronic signature).

The communication driver 205 of the mobile device 200a that receives this request, outputs the information specifying a type of application to the IC memory driver 203. The IC memory driver 203 retrieves the corresponding port ID from the IC memory 201a on the basis of the information specifying the type of the application. Then, the IC memory driver 203 outputs the retrieved port ID to the communication driver 205 (S504b). The communication driver 205 transmits the port ID to the mobile device 100 (S505b).

After the communication driver 105 receives the port ID, the application 102a outputs the message M and the domain ID of the IC memory 201 which is mounted on the mobile device 200 that is the destination, to the IC memory driver 105 to ask for the encryption processing of the message M which is the bill data to the IC memory 101. The IC memory driver 105 instructs the communication driver 105a to retrieve the public key for encryption from the key server. The communication driver 105a transmits the domain ID to the key server and retrieves the corresponding public key to the mobile device 100a from the key server storing the public key corresponding to the domain ID. Then, the communication driver 105a outputs the public key obtained here to the IC memory 101a via the IC memory driver 103. The IC memory 101a executes the encryption processing using the public key. Subsequently, the message M is encrypted as the message C, and the IC memory driver 103 retrieves the message C from the IC memory 101a and outputs to the communication driver 105a (S506a).

The communication driver 105a transmits the received message C together with the domain ID of the IC memory 201 and the port ID to the mobile device 200a the destination of which is the IP address (S507a).

The communication driver 205 of the mobile device 200 receives the port ID and activates the application 202a corresponding the port ID. When the application 202a detects the message C, the application 202a judges it to be an encrypted message, and outputs it to the IC memory 201a via the IC memory driver 203 for decryption. The IC memory 201a stores the private key corresponding to the public key used for the encryption, and decrypts the message C using the private key. The message M obtained by the decryption is output to the application 202a via the IC memory driver 103 (S508b).

The application 202a detects the message M and recognizes it as the bill data, instructing the IC memory driver 203 to execute the drawing processing. The IC memory driver 203 executes the processing of drawing to the IC memory 201a to retrieve the electronic money data from the IC memory 201a, and outputs it to the communication driver 205 via the application 202a (S509b). The communication driver 205 transmits the received electronic money data to the mobile device 100 (S510b).

The communication driver 105a of the mobile device 100a receives the electronic money data, and outputs it to the application 102a. When the application 102a detects that the electronic money data has been received, it instructs the IC memory driver 103 to execute the processing of adding the electronic money data to the IC memory 101a, and the IC memory driver 103 executes the summing processing (S511a).

The effect of the present invention executing the encryption described above will be explained. In addition to the effect of the invention described above referring to FIG. 2, by encrypting the message M which is a data to be transmitted with the public key corresponding to the domain ID, the confidentiality of communication may be improved.

Figure 7:
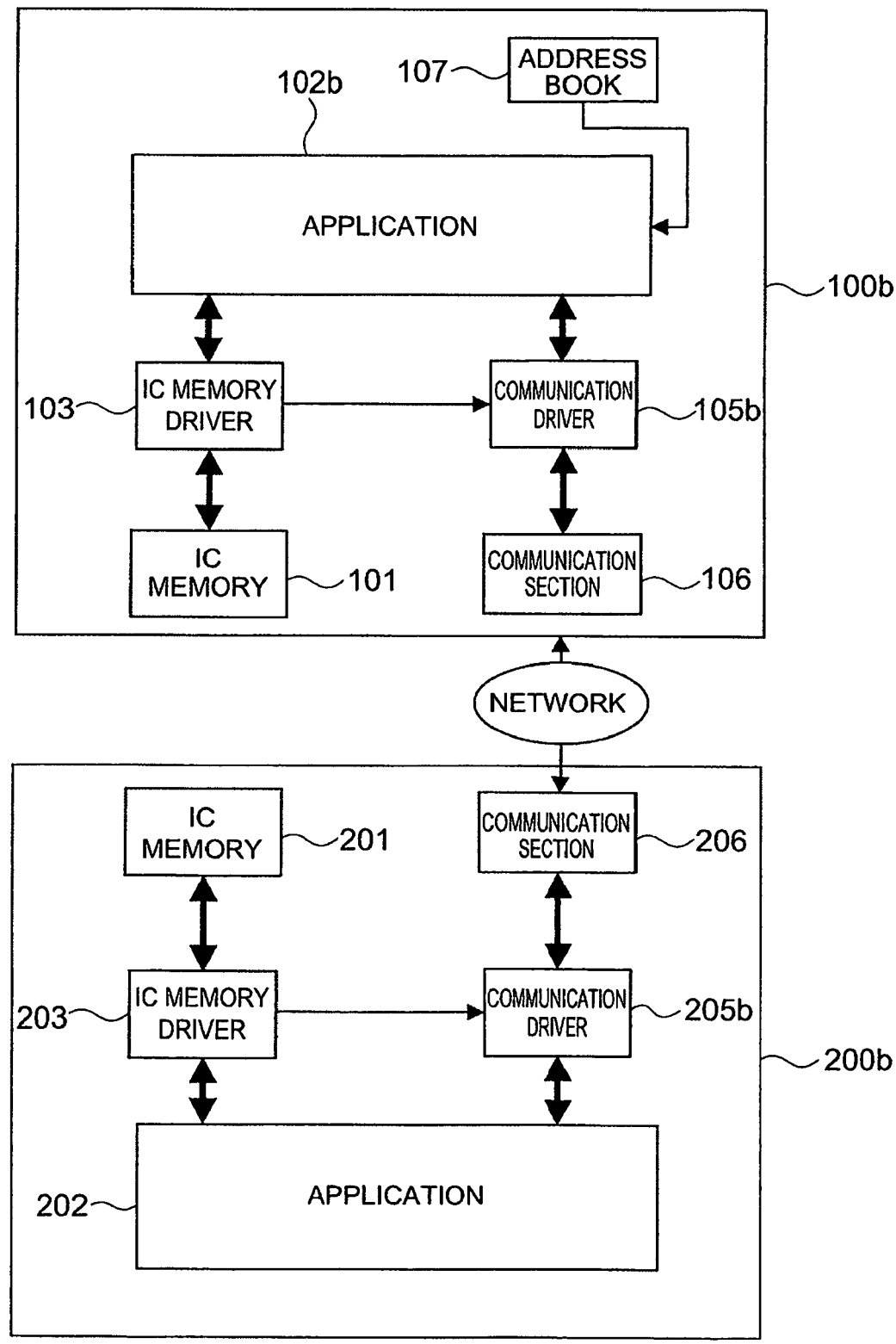
FIG. 7 is a block diagram of a mobile device 100b executing a broadcast processing and a mobile device 200b receiving a broadcast, of the present invention.

Next, the method of executing a transmission processing with a broadcast and obtaining a port ID will be explained. FIG. 7 is a block diagram of data communication devices 100b and 200b executing the transmission processing with the broadcast.

The mobile device 100b is provided with an IC memory 101, an application 102b (an accepting means of the present invention), an IC memory driver 103, a communication driver 105b (an obtaining means, transmitting means of the present invention), a communication section 106 (a transmitting means of the present invention), and an address book 107, and the mobile device 200b is provided with an IC memory 201, an application 202, an IC memory driver 203, a communication driver 205b, a communication section 206 and an address book 107.

The communication driver 105b receives a transmission request from the application 102b, and then transmits the domain ID accepted on the side of the application 102b and information specifying a type of the application addressed to an unspecified number of terminals in a network. The domain ID is transmitted, as we say, with the broadcast. When the communication driver 205b of the mobile device 200b that is the device of correspondent and that received the domain ID that has been transmitted with the broadcast, recognizes the domain ID as its own domain ID, it returns the IP address and the port ID of the mobile device 200b to the sender (mobile device 100b) of the broadcast transmission.

In this embodiment the IP address may be obtained with the broadcast, which eliminates the necessity of storing the domain ID in relationship to the IP address in the name server, and does not necessitate the domain ID registration section, however, the other configuration and function are the same as those explained referring to FIG. 2.

Figure 8:
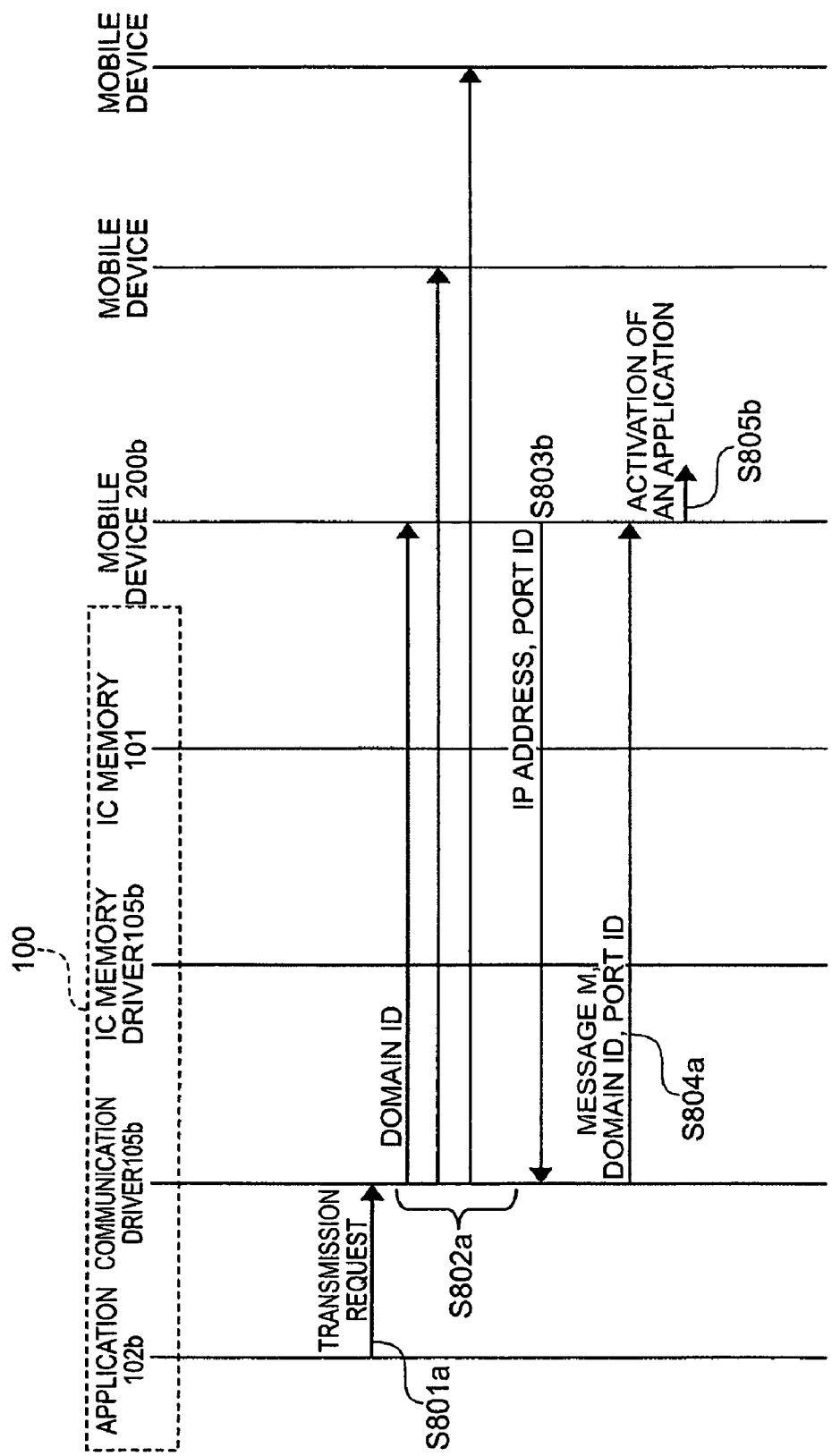
FIG. 8 is a sequence diagram showing a communication processing between the mobile device 100b and the mobile device 200b of the present invention.

FIG. 8 is a sequence diagram showing the processing thereof The application 102b accepts the domain ID of the device of correspondent by input operation of a user and requests for transmission (S801a). The communication driver 105b then transmits the accepted domain ID and the information specifying the running application 102b over the network with the broadcast (S802b). The mobile device 200b which is a mobile device corresponding to the domain ID, recognizes domain ID delivered by the broadcast as its own one, and then retrieves the corresponding port ID on the basis of the information specifying a type of application and returns the port ID together with the IP address of the mobile device 200b to the sender (mobile device 100b) which performed broadcast transmission (S803b).

The communication driver 105b which received the IP address and the port ID transmits the message M, the domain ID and the port ID to the mobile device 200b, the destination of which is the received IP address (S804a). On receiving this, the mobile device 200b recognizes the port ID and activates the corresponding application (S805b). Thereafter, the mobile devices 100b and 200b will perform the same procedures (S410b, S411b, S412a) as those shown in FIG. 4 (not shown in the figure).

The effect of the present invention described above will be explained. Transmission of the accepted domain ID and the information specifying a type of application with a broadcast does not necessitate the name server storing the domain ID in relationship to the destination information such as an IP address and makes it possible to obtain the destination information such as an IP address and the port ID of the other device and to transmit by specifying the detachable device such as an IC memory uniquely, without the processing of registering in the name server.

The invention claimed is:

1. A data communication device comprising:
a detachable IC memory attached to the data communication device and configured to store a unique domain ID uniquely assigned to the detachable IC memory, the detachable IC memory uniquely assigning a port ID in response to a port ID request from an application, the detachable IC memory storing information specifying the application to which the port ID is assigned in association with the assigned port ID;
a registration section configured to register the unique domain ID uniquely assigned to the detachable IC memory when the IC memory is mounted therein, the unique domain ID being registered in a server connected to a network, in relationship to a destination information of the data communication device;
a communication section configured to receive information specifying an application running on a correspondent device, the correspondent device transmitting data to the detachable IC memory; and
a retrieving driver configured to retrieve from the detachable IC memory a port ID corresponding to the information specifying the application,
wherein the communication section transmits the port ID the correspondent device, and
the application to which the port ID is assigned and the application running on the correspondent device perform money transactions, and the data transmitted by the correspondent device is electronic money data.

2. A data communication method comprising:
registering, in a server placed in a network, a unique domain ID uniquely assigned to an IC memory when the IC memory is mounted on a data communication device, the unique domain ID being registered in relationship to a destination information of the data communication device in which the IC memory is mounted, uniquely assigning, in the IC memory, a port ID in response to a port ID request from an application and storing information specifying the assigned application in relationship to the assigned port ID;
receiving information specifying an application running on a correspondent, device the correspondent device transmitting data to the IC memory;
retrieving, from the IC memory, a port ID corresponding to the received information specifying the application; and
transmitting the retrieved port ID to the correspondent device,
wherein the application to which the port ID is assigned and the application running on the correspondent device perform money transactions, and the data transmitted by the correspondent device is electronic money data.

* * * * *